United States Patent
Kawai (10) Patent No.: US 9,493,067 B2
(45) Date of Patent: Nov. 15, 2016

(54) STRADDLE VEHICLE

(75) Inventor: Hideaki Kawai, Kakogawa (JP)

(73) Assignee: Kawasaki Jukogyo Kabushiki Kaisha, Kobe-shi (JP)

(*) Notice: Subject to any disclaimer, the term of this patent is extended or adjusted under 35 U.S.C. 154(b) by 0 days.

(21) Appl. No.: 14/129,901

(22) PCT Filed: May 28, 2012

(86) PCT No.: PCT/JP2012/003462
§ 371 (c)(1),
(2), (4) Date: Dec. 27, 2013

(87) PCT Pub. No.: WO2013/001712
PCT Pub. Date: Jan. 3, 2013

(65) Prior Publication Data
US 2014/0116794 A1  May 1, 2014

(30) Foreign Application Priority Data
Jun. 30, 2011 (JP) ................................ 2011-145238

(51) Int. Cl.
*B60K 15/063* (2006.01)
*B60K 13/02* (2006.01)
*B62K 11/04* (2006.01)

(52) U.S. Cl.
CPC ............. *B60K 15/063* (2013.01); *B60K 13/02* (2013.01); *B62K 11/04* (2013.01)

(58) Field of Classification Search
USPC ............ 180/219, 229, 291, 68.1, 68.2, 68.3
See application file for complete search history.

(56) References Cited

U.S. PATENT DOCUMENTS

| 4,221,278 | A | * | 9/1980 | Ponzo ........................... 180/283 |
| 4,229,662 | A | * | 10/1980 | Nashimoto .................... 307/9.1 |
| 4,386,278 | A | * | 5/1983 | Kawada et al. ............... 307/9.1 |
| 4,577,917 | A | * | 3/1986 | Nashimoto et al. .......... 439/655 |
| 4,641,124 | A | * | 2/1987 | Davis .................. B60R 25/1018 340/426.23 |

(Continued)

FOREIGN PATENT DOCUMENTS

| EP | 1566540 A2 | 8/2005 |
| JP | 05016857 A | 1/1993 |

(Continued)

OTHER PUBLICATIONS

Japanese Patent Office, International Search Report of PCT/JP2012/003462, WIPO, Aug. 14, 2012, 4 pages.

(Continued)

*Primary Examiner* — Frank Vanaman
(74) *Attorney, Agent, or Firm* — Alleman Hall McCoy Russell & Tuttle LLP (57) ABSTRACT

In a straddle vehicle such as a motorcycle, a harness in an electric power supply system which is thick, has a great weight, and is not easily mounted can be reduced in length as much as possible so that a weight and cost can be reduced, and assembling work can be made easier. An air cleaner and a fuel tank are disposed at a relatively rearward position such that the air cleaner and the fuel tank are disposed behind and distant from the head pipe to provide an electric component mounting space between the air cleaner and the fuel tank, and the head pipe, and a regulator, a relay box and a fuse box are disposed in the electric component mounting space. The fuel tank is disposed at a relatively rearward position such that its rear end portion is positioned behind and below a rear end of a main frame.

9 Claims, 6 Drawing Sheets

(56) References Cited

U.S. PATENT DOCUMENTS

| | | | | |
|---|---|---|---|---|
| 5,497,036 | A | * | 3/1996 | Zemlicka .................. 307/9.1 |
| 5,853,058 | A | * | 12/1998 | Endo et al. ................ 180/65.1 |
| 5,869,907 | A | * | 2/1999 | Marler .................. B62J 6/18 |
| | | | | 307/10.1 |
| 7,527,115 | B2 | * | 5/2009 | Tsuya ....................... 180/68.2 |
| 8,378,235 | B2 | * | 2/2013 | Matsui ....................... 174/541 |
| 2004/0060545 | A1 | * | 4/2004 | Kurayoshi et al. ........ 123/472 |

FOREIGN PATENT DOCUMENTS

| | | |
|---|---|---|
| JP | 07309275 A | 11/1995 |
| JP | 10291450 A | 11/1998 |
| JP | 2000313388 A | 11/2000 |
| JP | 2001114158 A | 4/2001 |
| JP | 2003341573 A | 12/2003 |
| JP | 2006123656 A | 5/2006 |
| JP | 2006231952 A | 9/2006 |
| JP | 2007145132 A | 6/2007 |
| JP | 2008213541 A | 9/2008 |
| JP | 2011031717 A | 2/2011 |

OTHER PUBLICATIONS

European Patent Office, Extended European Search Report Issued in Application No. 12803926.0, Dec. 1, 2014, Germany, 6 pages.

* cited by examiner

Fig. 8

STRADDLE VEHICLE

TECHNICAL FIELD

The present invention relates to a straddle vehicle such as a motorcycle. The present invention also relates to a layout of electric components in an electric power supply system such as a regulator and a relay box through which a current of a great magnitude flows.

BACKGROUND ART

Conventionally, in straddle vehicles such as a motorcycle, various attempts have been made to ensure a layout space in which components incorporated into the vehicle, such as engine components and electric components, are placed. For example, in a motorcycle disclosed in Patent Literature 1, a component mounting member made of a resin is disposed such that it is surrounded by right and left main frames extending rearward from a head pipe and sandwiched between a fuel tank placed thereabove and an air-intake chamber placed therebelow, and a plurality of components are mounted to the component mounting member.

This component mounting member is provided integrally with mounting arms, engagement elements, guide elements, etc. Electric components such as an ignition coil, a CDI unit, a coupler, a switch, and a relay are easily mounted to the component mounting member, without using a tool. In front of the component mounting member, a regulator is mounted to the right and left main frames extending from the head pipe via brackets.

By the way, a current of a relatively great magnitude flows through the electric components in the electric power supply system, such as the regulator and the relay. Therefore, it is necessary to suppress a temperature increase in these components. In the case of the motorcycle, it is necessary to consider an influence of heat from the engine on these components. To this end, Patent Literature 2 discloses that the regulator is placed on an upper surface of an air cleaner in an air-intake system to block heat radiated from the engine placed therebelow, and heat radiation from the regulator is facilitated by air flowing through an interior of the air cleaner.

More specifically, in the motorcycle disclosed in Patent Literature 2, a fuel tank is disposed at a relatively rearward position and only in a rear half portion of a tank cover, the air cleaner is accommodated in front of the fuel tank, i.e., a front half portion of the tank cover, and the regulator is placed in a narrow space between the upper surface of the air cleaner and the tank cover covering the air cleaner from above. In addition, a control unit is disposed in this narrow space such that the control unit and the regulator are arranged side by side.

CITATION LIST

Patent Literature

Patent Literature 1: Japanese-Laid Open Patent Application Publication No. Hei 07-309275
Patent Literature 2: Japanese-Laid Open Patent Application Publication No. 2006-123656

SUMMARY OF INVENTION

Technical Problem

In the motorcycle disclosed in Patent Literature 2, since the regulator and the control unit are disposed in the narrow space between the upper surface of the air cleaner and the tank cover, there is no extra space. For this reason, other electric components in the electric power supply system, similar to the regulator, such as a relay box and a fuse box, cannot be placed in this space. Therefore, it is considered that in a conventional layout, typically, the relay box and the fuse box are placed in a space under a seat.

In this layout, a harness for connecting the regulator disposed in the front half portion of the tank cover as described above, i.e., in the vicinity of the head pipe, to the relay box or the fuse box, i.e., a harness for connecting the electric components in the electric power supply system to each other, becomes long. This increases the weight and cost. A conducting wire of the harness in the electric power supply system, through which a current of a relatively great magnitude flows, is thick (has a great cross-section). In addition, a coating for insulatively protecting the conducting wire is also thick. Therefore, the weight and cost increase. Moreover, such a thick harness is not easily bent. Therefore, it is difficult to mount the harness to a vehicle body.

In view of the above circumstances, an object of the present invention is to reduce the weight and cost and make assembling work easier, by devising a layout of electric components in an electric power supply system in a straddle vehicle, to provide the shortest possible length of a harness in the electric power supply system, which is thick, has a great weight and is not easily mounted to a vehicle body.

Solution to Problem

To achieve the above mentioned object, according to the present invention, there is provided a straddle vehicle in which an ignition switch is disposed in the vicinity of a head pipe of a vehicle body frame, comprising: a fuel tank disposed behind and distant from the head pipe; an air cleaner disposed behind and distant from the head pipe; and an electric component mounting space which is provided between the head pipe, and the fuel tank and the air cleaner which are behind the head pipe, and in which two or more electric components in an electric power supply system, including at least a relay box of ignition, are disposed.

In accordance with this configuration, since the fuel tank and the air cleaner are disposed at a relatively rearward position to ensure the electric component mounting space of a sufficiently great size, in front of the fuel tank and the air cleaner, two or more electric components in the electric power supply system, such as the relay box of ignition and a regulator, can be disposed in this space such that these components are close to each other. Therefore, a harness in the electric power supply system, for connecting these components to each other, can be reduced in length. Thus, the weight and cost can be reduced, and assembling work can be made easier.

Typically, in a straddle vehicle, an ignition switch is disposed in the vicinity of the head pipe to enable a user to operate the ignition switch easily. Since a harness for connecting this ignition switch and an ignition relay to each other is reduced in length, the weight and the cost can be reduced.

Preferably, as the electric components in the electric power supply system, all of the relay box, the regulator, and the fuse box may be disposed in the electric component mounting space. This makes it possible to effectively reduce the harness in amount in the electric power supply system. Therefore, the weight and the cost can be reduced significantly. Also, the assembling work can be made easier.

Regarding the regulator which generates a great amount of heat, a heat radiation plate attached to a case of the regulator may be disposed below a lower end of the head pipe to directly receive ram air from forward. By comparison, preferably, a coupler of a harness which is connected to the case of the regulator is disposed behind a bracket fastened to the vehicle body frame not to directly receive the ram air. This makes it possible to effectively facilitate heat radiation from the regulator while preventing rain water, etc., from flowing into the case of the regulator through the coupler.

The fuse box may be disposed in a space above the regulator and covered with a detachable cover, from above. In this layout, a fuse can be easily changed, and therefore maintenance work becomes easier. The detachable cover may be provided integrally with or separately from a tank cover for covering the fuel tank disposed at a rearward position. In either case, an external appearance is improved in a configuration in which the detachable cover and the tank cover have a unitary structure.

Regarding the fuel tank and the air cleaner disposed behind the electric component mounting space, the fuel tank may be disposed at a relatively higher position, the air cleaner may be disposed below the fuel tank, and a recess may be formed on an upper surface of the air cleaner to accommodate an ECU therein. The ECU is an electric component in a control system. Each of signal wires connected to the ECU is not so thick. However, there are many signal wires connected to the ECU. Therefore, a harness which is a bundle of the signal wires is thick (has a great cross-section).

In view of this, the plurality of electric components in the electric power supply system are disposed in the electric component mounting space as described above, and the ECU for controlling these components is disposed behind and near the electric component mounting space. This makes it possible to reduce the length of the harness in the control system for connecting the ECU and the electric components to each other, and therefore significantly reduces the weight and the cost. In addition, the reduction of the length of the harness in the control system has an advantage that generation of noise can be prevented. The air cleaner made of a resin also serves as an electromagnetic shield and therefore can lessen the influence of noise on the ECU accommodated in the recess provided on the upper surface of the air cleaner.

In a case where the electric component mounting space of a great size, which allows two or more electric components in the electric power supply system to be disposed therein, is provided in front of the fuel tank and the air cleaner, as described above, this might cause a possibility that the volume of the fuel tank is reduced. Also, this might cause a possibility that air from forward cannot be easily introduced into the air cleaner.

In view of this, air-intake ducts may be provided at right and left sides of a front portion of the air cleaner such that the air-intake ducts extend forward at right and left sides of the electric component mounting space in front of the air cleaner, respectively. With this configuration, even when the electric component mounting space has a great size, the air can be smoothly introduced into the air cleaner through the air-intake ducts provided at right and left sides of the electric component mounting space such that the air-intake ducts do not interfere with the electric component mounting space, and efficiency of air-intake into the air cleaner can be increased by utilizing the ram air. In addition, since the air-intake ducts surround the electric component mounting space from rightward and leftward, the electric components can be protected from rain water, etc.

The entire fuel tank may be disposed at a relatively rearward position, to ensure its volume. Specifically, a rear end portion of the fuel tank may be positioned behind a rear end of a main frame extending rearward from the head pipe in the straddle vehicle. In this layout, a sufficient volume of the fuel tank can be ensured while ensuring the electric component mounting space of a desired size in front of the fuel tank.

Advantageous Effects of Invention

As described above, in accordance with the straddle vehicle of the present invention, the electric component mounting space is provided between the head pipe, and the fuel tank and the air cleaner which are behind the head pipe, and two or more electric components in the electric power supply system, including the relay box of ignition, are disposed in the electric component mounting space such that they are close to each other. Thus, the harness in the electric power supply system which is thick and has a great weight can be reduced, the weight and the cost can be reduced, and the assembling work can be made easier. In addition, a harness for connecting an ignition switch and an ignition relay to each other is reduced in length. This can also reduce the weight and the cost.

DESCRIPTION OF EMBODIMENTS

Figure 1:
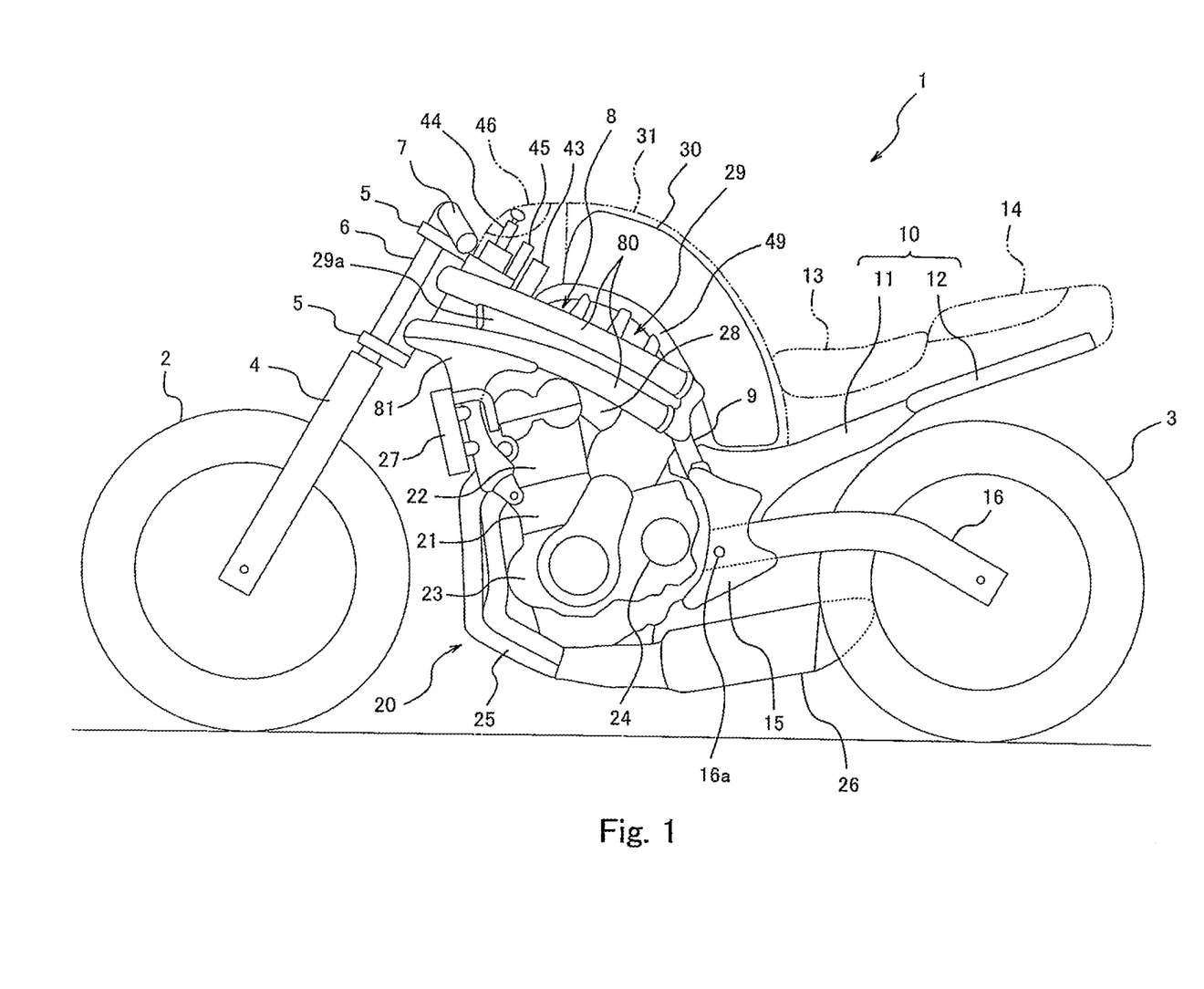
FIG. 1 is a left side view schematically showing an overall configuration of a motorcycle according to an embodiment of the present invention.
Figure 2:
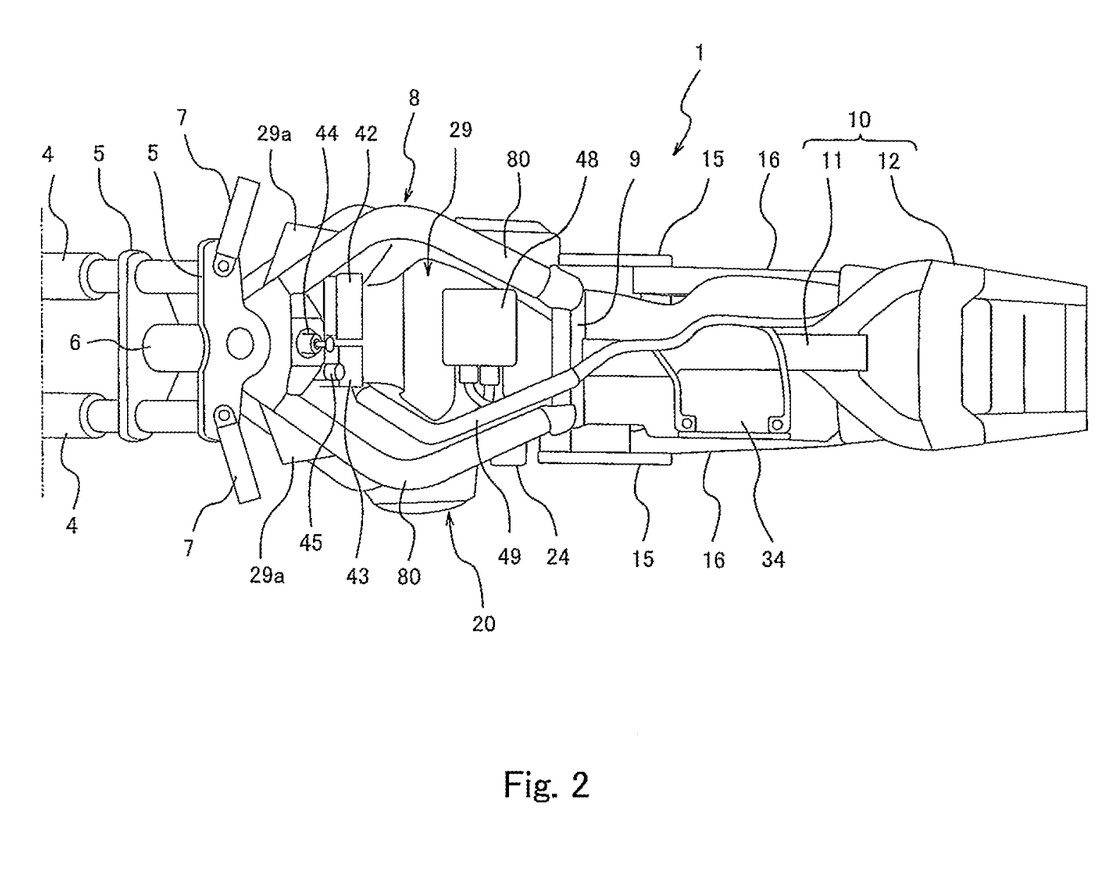
FIG. 2 is a plan view schematically showing the overall configuration of the motorcycle.

Hereinafter, a motorcycle 1 (straddle vehicle) according to an embodiment of the present invention will be described with reference to the drawings. FIG. 1 is a left side view showing a schematic configuration of the motorcycle 1, from which lights, cowlings, etc., are detached. FIG. 2 is a plan view showing the schematic configuration of the motorcycle, from which a fuel tank, a seat, etc., in addition to the lights, the cowlings, etc., are detached. Note that the directions used hereinafter are the perspective of a rider (user) straddling the motorcycle.

The motorcycle 1 includes a front wheel 2 which is a driven wheel and a rear wheel 3 which is a drive wheel. The front wheel 2 is rotatably mounted to lower end portions of a pair of right and left front forks 4 extending substantially vertically. Upper portions of the front forks 4 are mounted to a steering shaft (not shown) via a pair of upper and lower brackets 5. The steering shaft is inserted into a head pipe 6 which is a portion of a vehicle body frame of the motorcycle 1, and rotatably supported thereinto.

The upper bracket 5 is attached with right and left separate handles 7. Holding the handles 7, the rider can steer the front forks 4 and the front wheel 2. The right handle 7 is integrally provided with a throttle grip (not shown) which is gripped by the user's right hand. In front of the throttle grip, a brake lever (not shown) corresponding to the front wheel 2 is provided. In front of the left handle 7, a clutch lever (not shown) is provided.

As can be seen from FIGS. 1 and 2, the vehicle body frame of the motorcycle 1 includes a main frame 8 extending rearward from the head pipe 6 such that the main frame 8 is inclined slightly downward. The main frame 8 includes two frame members, i.e., right and left frame members 80 extending rearward from the head pipe 6. In this example, each of the frame members 80 is composed of two pipe members 80a, 80b (their reference symbols are shown in FIGS. 3 to 7) which are arranged at upper and lower sides. As will be described later, rear ends of the right and left frame members 80 are joined to each other by means of a cross member 9 having a substantially rectangular shape with a closed cross-section, and joined to a rear frame 10 by means of the cross member 9.

In the present embodiment, the rear frame 10 includes a backbone frame 11 including two steel press plates 11a, 11b (their reference symbols are shown only in FIG. 3) which are joined to each other from rightward and leftward and having a closed cross-section structure, and a rear pipe frame 12 provided behind and connected to the backbone frame 11. As shown in FIG. 2, the backbone frame 11 extends forward and rearward through a substantially center region in the vehicle width direction. As indicated by a virtual line in FIG. 1, a seat 13 which is straddled by the rider is disposed over an upper portion of the backbone frame 11. Likewise, as indicated by a virtual line in FIG. 1, a seat 14 which is straddled by a tandem rider is disposed over an upper portion of the rear pipe frame 12 disposed behind the backbone frame 11.

The backbone frame 11 includes a pivot frame member extending downward from the cross member 9 and a rear stay member extending rearward from the cross member 9 such that the rear stay member is inclined slightly upward. The pivot frame member and the rear stay member have a unitary structure. Plate-shaped sub-frames 15 are provided at right and left sides of the pivot frame member and joined to each other by a stay (not shown) extending in the vehicle width direction, etc. Between the pivot frame member and each of the sub-frames 15, a pivot 16a to which a front end portion of a swing arm 16 is mounted such that the swing arm 16 is pivotable around the pivot 16a. The rear wheel 3 is rotatably mounted to a rear end portion of the swing arm 16.

Below the main frame 8, an engine 20 having a plurality of cylinders is placed. A cylinder block 21 and a cylinder head 22 of the engine 20 are inclined slightly forward. A front portion of the cylinder block 21 is mounted to a down frame 81 extending downward from the main frame 8. A crankcase 23 is attached to a lower portion of the cylinder block 21. A transmission case which is provided behind and integrally with the crankcase 23 is mounted to the backbone frame 11. An alternator 24 is disposed at a left side of the transmission case.

Exhaust ports corresponding to each of the cylinders are formed in a front portion of the cylinder head 22. Exhaust manifolds 25 connected to the exhaust ports, respectively, are joined together in a position below the engine 20 to form a single manifold connected to a muffler 26. A radiator 27 for exchanging heat between a coolant of the engine 20 and ram air is disposed above the exhaust manifolds 25 and mounted to the down frame 81. Intake ports are formed in a rear portion of the cylinder head 22. A throttle body 28 is connected to the intake ports. An upper portion of the throttle body 28 is connected to a lower portion of an air cleaner 29 accommodating an element for filtering intake air.

Figure 4:
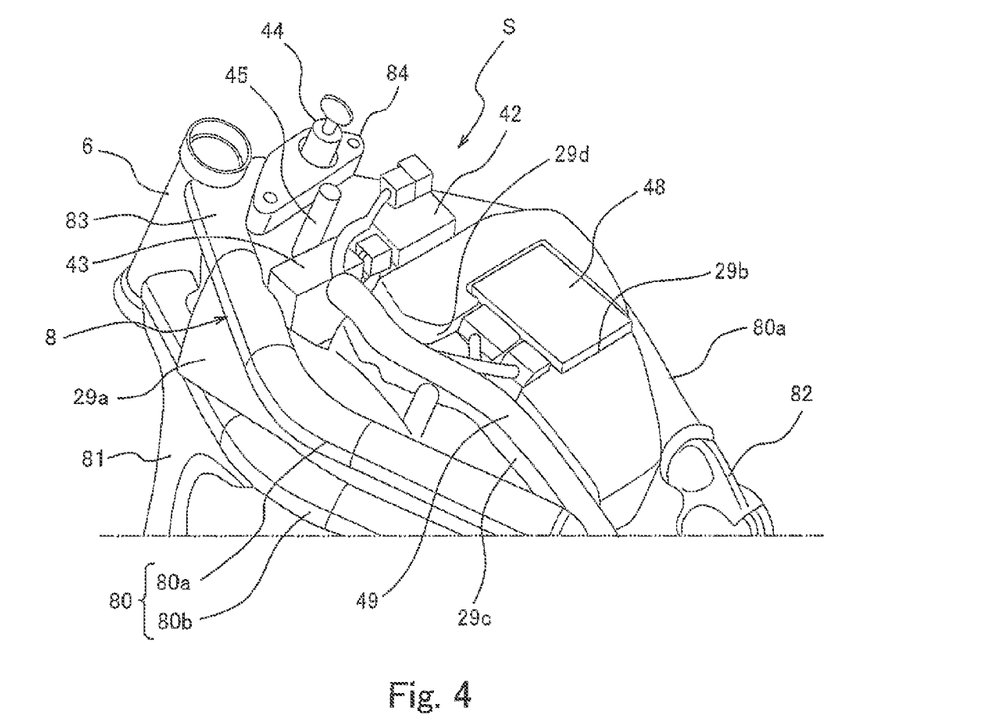
FIG. 4 is a perspective view showing from leftward and rearward, a layout of an air cleaner and electric components in an electric power supply system with a fuel tank detached from the motorcycle.

As shown in FIG. 2, the main frame 8 has a configuration in which the main frame members 80 extend rearward from the head pipe 6 and gradually outward in the vehicle width direction such that a distance between them in the vehicle width direction is greatest in a substantially center region, and then extend rearward such that its distance gradually decreases. The air cleaner 29 is disposed in a region from a location near the greatest distant portion of the main frame 8 to a rear end portion of the main frame 8. The air cleaner 29 is surrounded by the right and left frame members 80. As shown in FIGS. 1 and 4, the air cleaner 29 protrudes such that its upper surface is located above the right and left frame members 80.

Air-intake ducts 29a are provided at right and left corners of a front portion of the air cleaner 29 such that the air-intake ducts 29a extend forward therefrom. In this example, each of the air-intake ducts 29a extends through a space between the upper and lower round pipes 80a, 80b of the corresponding frame member 80. The air-intake ducts 29a extend forward such that the air-intake ducts 29a surround an electric component mounting space S as will be described later from rightward and leftward. The ram air is taken into the air-intake ducts 29a and smoothly supplied to an interior of the air cleaner 29. By utilizing a ram air pressure, air-intake efficiency can be increased.

The fuel tank 30 is disposed in a region from a location above the air cleaner 29 protruding upward to be above the main frame 8 as described above, to a location which is behind the air cleaner 29. As indicated by a virtual line in FIG. 1, the fuel tank 30 is covered with a tank cover 31. A front end of the fuel tank 30 and a front end of the tank cover 31 substantially conform in position to a front end of the air cleaner 29. By comparison, a rear end of the fuel tank 30 and a rear end of the tank cover 31 are positioned behind a rear end of the main frame 8. A rear end portion of the fuel tank 30 extends to a location below the rear end of the main frame 8 and overlaps with a front portion of the rear frame 10.

In summary, in the present embodiment, the air cleaner 29 and the fuel tank 30 are disposed at a relatively rearward position as a whole, and the front end portion of the air cleaner 29 and the front end portion of the fuel tank 30 are greatly distant from the head pipe 6. This allows a space (hereinafter this space will be referred to as the electric component mounting space S) to be provided between the air cleaner 29 and the fuel tank 30, and the head pipe 6. As will be described later with reference to FIGS. 4 to 10, in the electric component mounting space S, a plurality of electric components in an electric power supply system, such as a regulator 41, a relay box 42 and a fuse box 43, are disposed.

—Joining Structure of Main Frame and Rear Frame—

Figure 3:
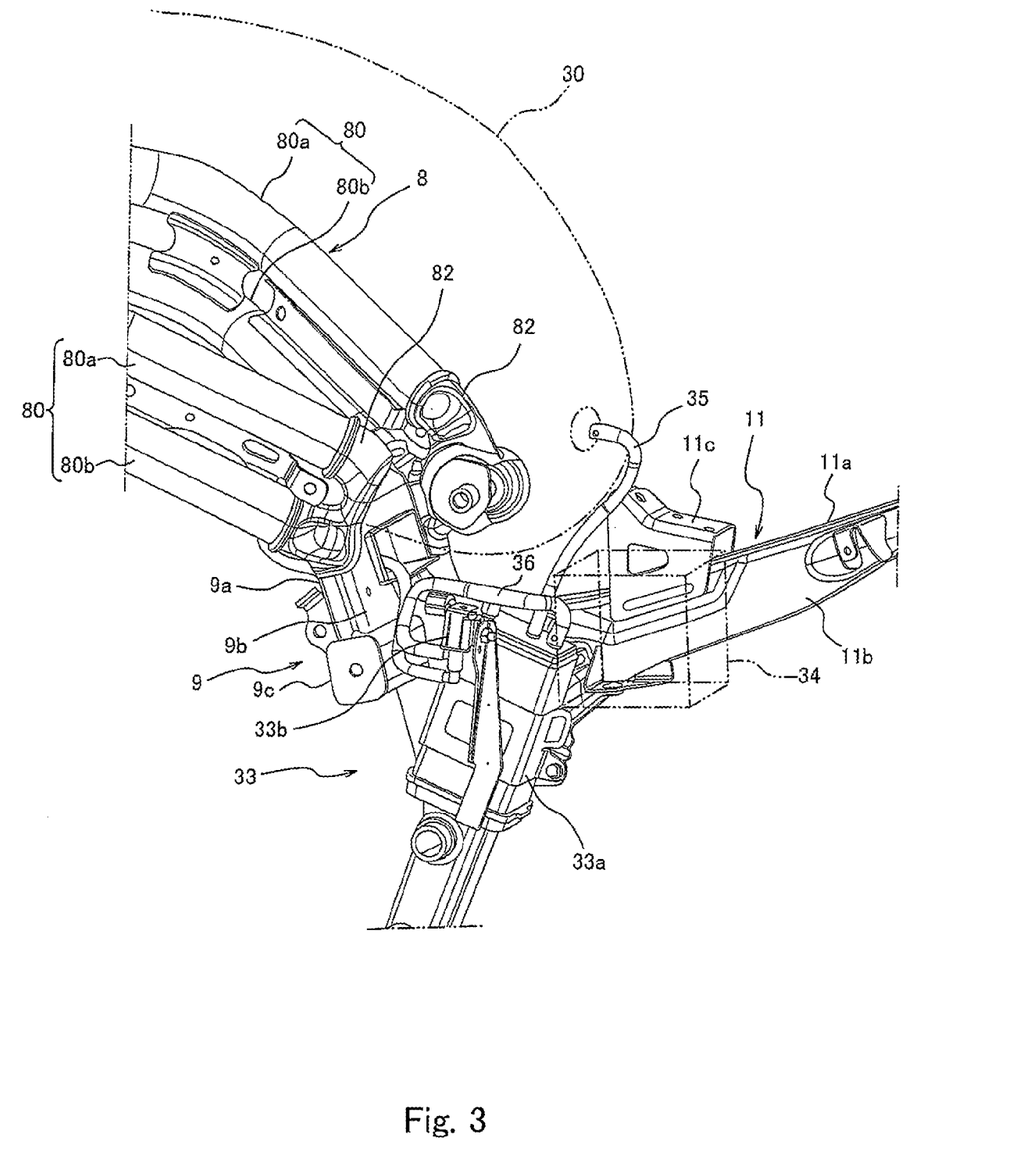
FIG. 3 is perspective view showing a joining structure of a main frame and a rear frame in an enlarged manner.

To dispose the fuel tank 30 at a relatively rearward position as described above, in the present embodiment, the cross member 9 having the closed cross-section structure is used to join the main frame 8 and the rear frame 10 in the motorcycle 1 to each other. FIG. 3 is an enlarged view showing the joining structure of the main frame 8 and the rear frame 10. Rear end portions of the upper and lower round pipes 80a, 80b of each of the right and left frame members 80 of the main frame 8 are joined to each other by means of a joint member 82. Right and left joint members 82 are fastened to a right upper portion and a left upper portion of the cross member 9, respectively.

The cross member 9 has the closed cross-section structure in which the two steel plates 9a, 9b manufactured by press-forming are joined to each other in a forward and rearward direction and a thickened square pipe 9c is welded to lower edges of the steel plates 9a, 9b. This structure allows the cross member 9 to have a stiffness which is equal to or higher than that of a conventional general pipe layout while achieving space saving. Also, this structure makes it possible to ensure a space continuous from a location which is above the cross member 9 to a location which is behind the cross member 9, where the rear end portion of the fuel tank 30 is located.

As shown in FIG. 3, the cross member 9 formed by a thick plate having a rectangular shape as a whole extends downward from a location under rear end portions of the right and left frame members 80 of the main frame 8 such that the cross member 9 is inclined rearward, and a front portion of the backbone frame 11 is welded to a portion of the cross member 9 from a rear surface thereof to a lower portion thereof. As indicated by a virtual line in FIG. 3, the rear end portion of the fuel tank 30 is positioned from the location which is above the cross member 9 to the location which is behind the cross member 9.

As shown in FIG. 3, the rear stay member of the backbone frame 11 is provided with a support member 11c for supporting the rear end portion of the fuel tank 30 such that the support member 11c is provided over right and left sides of the rear stay member. The support member 11c also serves as a mounting seat of the seat 13. In a space at a left side of the backbone frame 11, a canister unit 33 is provided below and in close proximity to the rear end portion of the fuel tank 30 to temporarily store and purge the evaporation fuel. A battery 34 (indicated by a virtual line) is disposed behind and at an upper side of the canister unit 33.

The canister unit 33 is configured in such a manner that a hose 35 used to introduce the evaporation fuel from the rear end portion of the fuel tank 30 and a hose 36 used to feed the evaporation fuel from inside of a canister body 33a of a rectangular box shape to the throttle body 28 are connected to an upper surface of the canister body 33a. A purge control valve 33b is provided in an intermediate portion of the hose 35 to control a flow (rate) of the evaporation fuel. Since the canister unit 33 is positioned in the vicinity of the fuel tank 30, the hose 35 which is expensive can be reduced in length.

—Layout of Electric Components in Electric Power Supply System and Harnesses—

Figure 5:
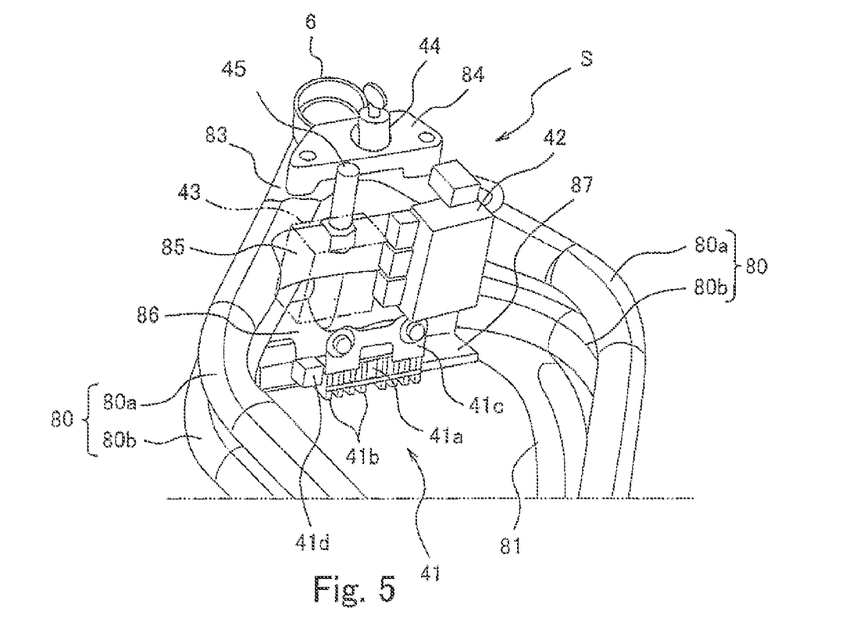
FIG. 5 is a perspective view showing a layout of the electric components in the electric power supply system, with the air cleaner, in addition to the fuel tank, detached from the motorcycle.
Figure 6:
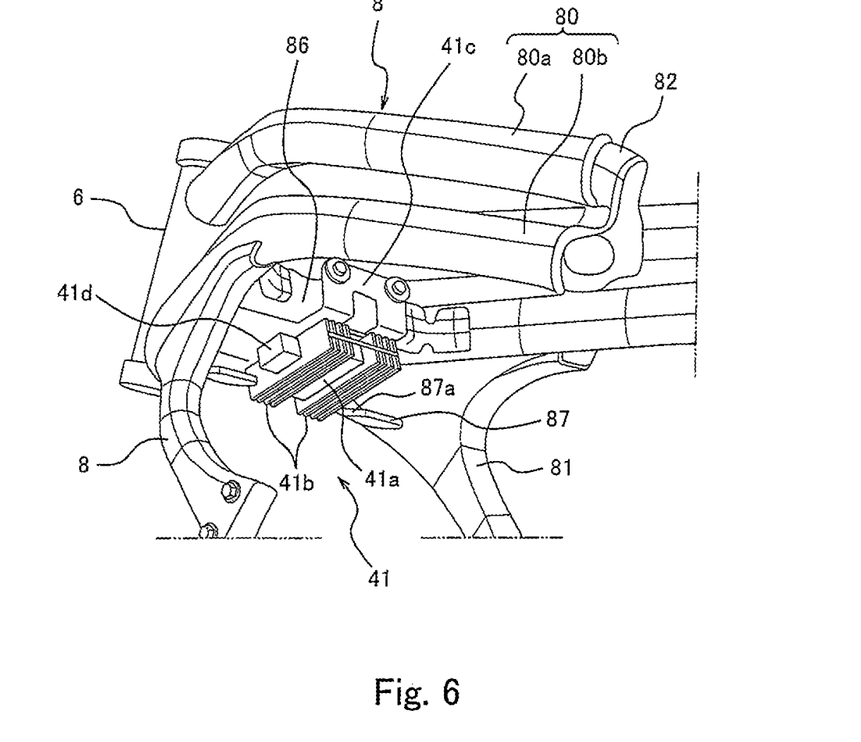
FIG. 6 is a perspective view showing placement of a regulator when viewed from below.
Figure 7:
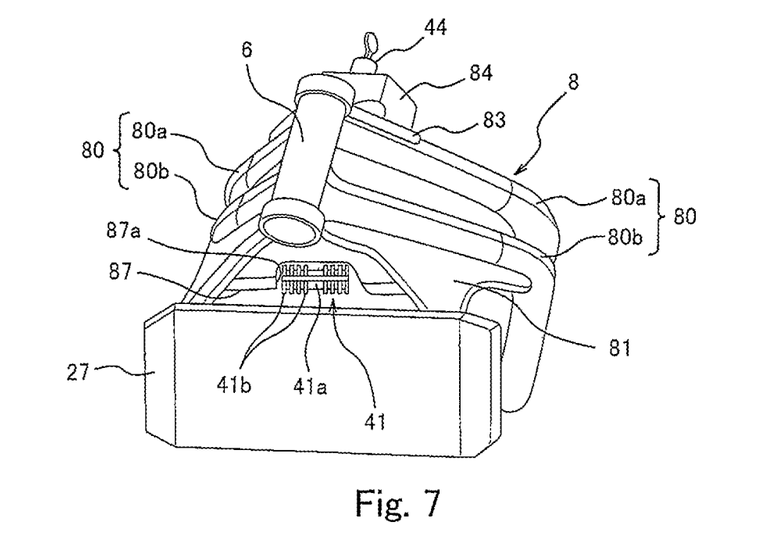
FIG. 7 is a perspective view showing placement of the regulator when viewed from forward.
Figure 8:
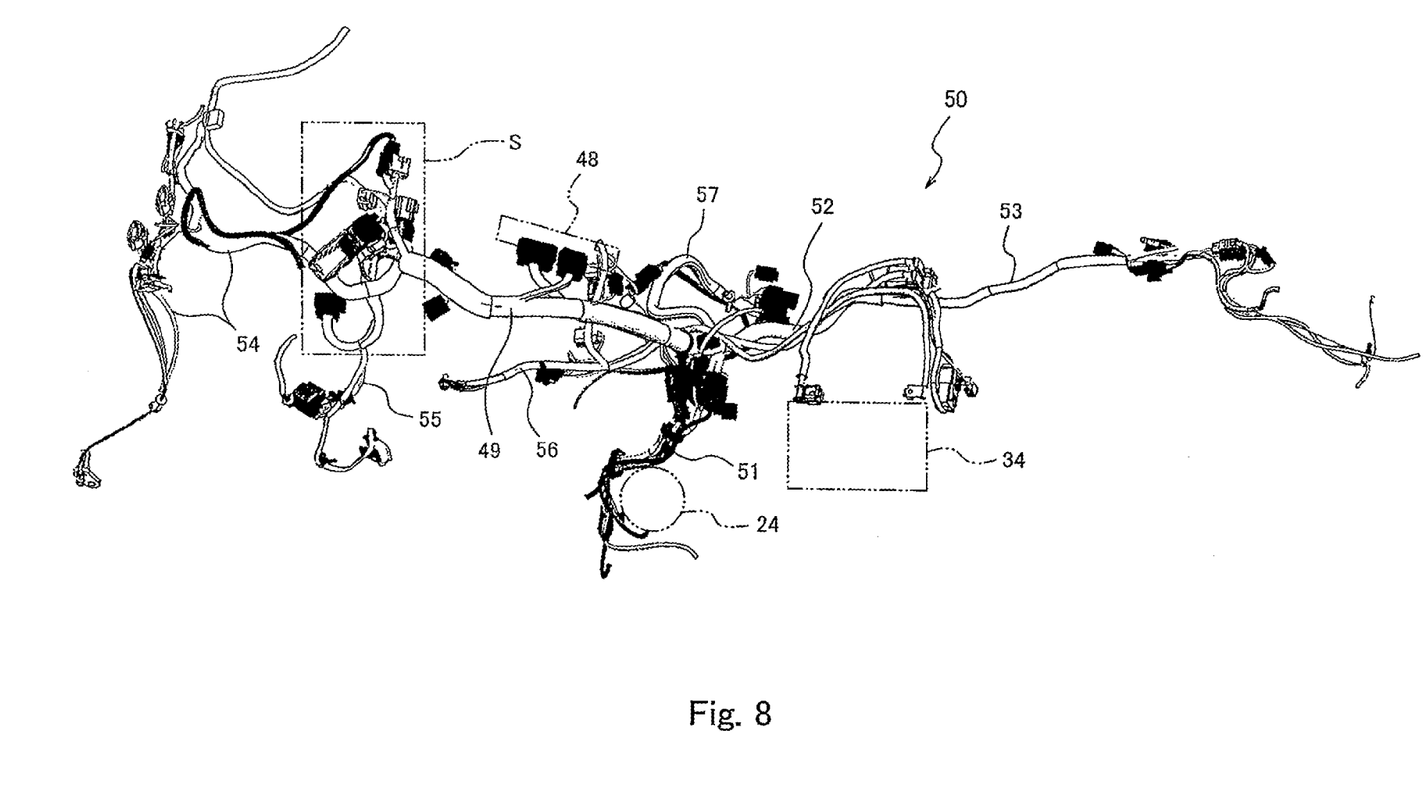
FIG. 8 is a view showing an overall harness of the motorcycle.

Next, with reference to FIGS. 4 to 8, the layout of the electric components in the electric power supply system and the harnesses in the present embodiment will be described. FIG. 4 is a perspective view showing a layout of the air cleaner 29 and the electric components in the electric power supply system with the fuel tank 30 and the tank cover 31 detached from the motorcycle 1. FIG. 5 is a perspective view showing the layout of the electric components with the air cleaner 29, in addition to the fuel tank 30 and the tank cover 31, detached from the motorcycle 1. FIG. 6 is a view showing placement of the regulator 41 when viewed from below and FIG. 7 is a view showing the placement of the regulator 41 when viewed from forward. FIG. 8 is a view showing the overall layout of the harnesses in the motorcycle 1.

In the motorcycle 1 of the present embodiment, as described above, the air cleaner 29 and the fuel tank 30 are disposed at a relatively rearward position, to ensure the electric component mounting space S of a desired size in front of the air cleaner 29 and the fuel tank 30, and the electric components in the electric power supply system such as the regulator 41, the relay box 42 and the fuse box 43 are disposed in the electric component mounting space S. In addition to these, an ignition switch 44 and a falling sensor 45 are disposed in the electric component mounting space S.

As shown in FIGS. 4 to 7, a bracket 83 is joined and welded to front ends of the right and left frame members 80 of the main frame 8 such that the bracket 83 covers the upper round pipes 80a of the right and left frame members 80 from above. The ignition switch 44 is attached to a bracket 84 provided on an upper portion of the bracket 83. A cross pipe 85 is disposed behind the bracket 83 such that the cross pipe 85 is placed between the upper round pipes 80a of the right and left frame members 80 to each other and connects them. The relay box 42 and the fuse box 43 are attached to the cross pipe 85.

In the same manner, a cross pipe 86 is placed between the lower round pipes 80b of the right and left frame members 80 and connects them to each other. The regulator 41 is attached to the cross pipe 86. When the motorcycle 1 is viewed from below, as shown in FIG. 6, the regulator 41 is configured such that heat radiation plates 41b are attached to an entirety of a metal case 41a and a mounting element 41c extending upward from a rear edge of the case 41a in a bent shape is fastened to the cross pipe 86. A bracket 87 is welded to the right and left down frames 81 to connect them to each other, in front of and in close proximity to the regulator 41. The bracket 87 is provided with a hollow space 87a to expose a front surface of the regulator 41.

When the motorcycle 1 is viewed from forward, as shown in FIG. 7, the regulator 41 is positioned below a lower end of the head pipe 6, a front surface of the case 41a faces forward through the hollow space 87a of the bracket 87, and the heat radiation plates 41b directly receive the ram air through a space formed between the head pipe 6 and the radiator 27. This makes it possible to effectively facilitate the heat radiation from the regulator 41 by the ram air, during driving of the motorcycle 1.

As shown in FIG. 6, a coupler 41d connected to the harness is attached to a left side of the case 41a of the regulator 41. The coupler 41d is positioned behind a portion of the bracket 87 which is leftward relative to the hollow space 87a. This portion of the bracket 87 serves as a wall for preventing the coupler 41d from directly receiving the ram air. Because of this, even when rain water or the like carried by the ram air adheres to the heat radiation plates 41b of the regulator 41, it is prevented from flowing into the case 41a through the coupler 41d.

The regulator 41 is disposed in a lower region of the electric component mounting space S, and is cooled by the ram air. By comparison, the relay box 42 and the fuse box 43 are disposed in an upper region of the electric component mounting space S. As indicated by a solid line in FIG. 5, the relay box 42 is disposed at a right side. As indicated by a virtual line in FIG. 5, the fuse box 43 is disposed at a left side of the relay box 42 such that the fuse box 43 and the relay box 42 are arranged side by side. The falling sensor 45 is disposed in front of and in close proximity to the fuse box 43.

The relay box 42, the fuse box 43 and the falling sensor 45 are covered with an electric component cover 46 indicated by a virtual line in FIG. 1. For example, the electric component cover 46 is a resin-molded product. The electric component cover 46 is detachably disposed in front of the tank cover 31 such that the electric component cover 46 extends over the right and left frame members 80 of the main frame 8. The electric component cover 46 covers the electric component mounting space S from above. In addition, as described above, the electric component mounting space S is surrounded by the right and left frame members 80 and the air-intake ducts 29a from rightward and leftward so that it is protected from rain water or the like.

The electric component cover 46 has a shape in which its upper surface is continuous with an upper surface of a front end portion of the tank cover 31 and its right and left side surfaces are continuous with right and left side surfaces of the front end portion of the tank cover 31, although this is not shown in detail. In other words, the electric component cover 46 is integral with the tank cover 31 in its appearance. This structure can improve an external appearance of these covers. A recess is formed in a front portion of the electric component cover 46 such that the recess opens from forward to upward. An upper portion of the ignition switch 44 protrudes upward such that the ignition switch 44 penetrates a bottom portion of the recess.

As shown in FIGS. 4 and 5, the ignition switch 44 is attached to the bracket 84 which is higher than the main frame 8 and is placed behind and in close proximity to the head pipe 6 such that the ignition switch 44 extends upward substantially in parallel with the head pipe 6. An upper end portion of the ignition switch 44 is located higher than an upper end of the head pipe 6 so that the rider can easily operate the ignition switch 44. A head lamp, meters, etc., are disposed in front of the head pipe 6, although these are not shown. In the present embodiment, the head lamp, the meters, etc., can be made closer to a front side of the head pipe 6 without interfering with the ignition switch 44. Thus, the design is flexible.

Since the ignition switch 44 is disposed in the electric component mounting space S in this way, a harness connecting the ignition switch 44 to the relay box 42 can be significantly reduced in length. In addition, a harness in the electric power supply system, for connecting the regulator 41, the relay box 42 and fuse box 43 to each other, in the electric component mounting space S, can also be significantly reduced in length. In the present embodiment, furthermore, as shown in FIG. 3, an engine control unit 48 (hereinafter will be referred to as ECU 48) is disposed on an upper surface of the air cleaner 29 just behind the electric component mounting space S.

Differently from the regulator 41, the fuse box 43, or the like, the ECU 48 is an electric component in a control system. A current which is not so great in magnitude flows through signal wires in the control system which are connected to the ECU 48. For this reason, each of the signal wires is not thick. However, there are many signal wires connected to the ECU 48. Therefore, a harness which is a bundle of many signal wires is thick (has a great cross-section). In view of this, the air cleaner 29 is provided on the upper surface with a recessed accommodating section 29b having a rectangular shape to accommodate the ECU 48 therein and a recessed fitting section 29c to accommodate therein the above stated thick harness which is a bundle of many signal wires.

Specifically, as shown in FIG. 4, the recessed fitting section 29c is formed on the upper surface of the air cleaner 29 such that the recessed fitting section 29c extends forward and rearward along a left edge of the upper surface of the air cleaner 29, and the recessed fitting section 29c and the recessed accommodating section 29b of the ECU 48 are communicated with each other via a communication groove 29d having a great width. The harness in the control system extending forward and rearward in the vehicle body from the ECU 48 is bundled with the harness in the electric power supply system for connecting the regulator 41, the relay box 42 and the fuse box 43 in the electric component mounting space S to the alternator 24 and the battery 34, which are disposed behind the regulator 41, the relay box 42 and the fuse box 43, to form a main harness 49 extending forward and rearward along the recessed fitting section 29c.

FIG. 8 shows an overall layout of a harness 50 in the motorcycle 1, in which the vehicle body and the like are not shown. In FIG. 8, leftward indicates forward relative to the motorcycle 1, while rightward indicates rearward relative to the motorcycle 1. The main harness 49 extends from the electric component mounting space S at a forward side of the vehicle body to a region in the vicinity of a center of the vehicle body. A harness 51 in the electric power supply system extends between the main harness 49 and the alternator 24 located below the main harness 49, while a harness 52 in the electric power supply system extends between the main harness 49 and the battery 34 behind the main harness 49. A harness 53 connected to, for example, a back lamp (not shown), a direction indicator (not shown), etc., extends rearward from the harnesses 51, 52. A harness 54 connected to, for example, a head lamp (not shown), a direction indicator (not shown), a vehicle speed sensor (not shown) of the front wheel 2, etc., extends forward relative to the electric component mounting space S.

In FIG. 8, reference symbol 55 designates a harness connected to a horn (not shown), an electric fan (not shown), etc. Reference symbol 54 designates a harness connected to the throttle body 28 (see FIG. 1) and an injector (not shown) in the engine 20. Reference symbol 55 designates a harness connected to an ABS unit (not shown).

As can be seen from FIG. 8, the main harness 49 extending rearward from the electric component mounting space S is very thick. However, a harness which is as thick as the main harness 49 does not exist. Therefore, as a whole, the harness 50 can be made much less in amount than the harness of the conventional general motorcycle. In general, a thick harness increases the weight and cost. In addition, such a thick harness is not easily bent, and hence is not easily mounted to the vehicle body. However, in the present embodiment, the thick main harness 49 is approximately as long as the main frame 8, as described above.

As described above, the main harness 49 which is thick, has a great weight and is not easily bent is accommodated in the recessed fitting section 29c extending along the left edge of the upper surface of the air cleaner 29. Therefore, in an assembling work, the ECU 48 is fitted into the recessed accommodating section 29b, while the main harness 49 is fitted into the recessed fitting section 29c in such a manner that a socket of the main harness 49 is inserted into a coupler of the ECU 48, and the coupler and the socket are attached together to the upper surface of the air cleaner 29. In this way, the main harness 49 is easily mounted.

In accordance with the motorcycle 1 of Embodiment 1, as described above, the air cleaner 29 and the fuel tank 30 are disposed at a relatively rearward position, to ensure the electric component mounting space S of an adequate size between the air cleaner 29 and the fuel tank 30, and the head pipe 6 in front of the air cleaner 29 and the fuel tank 30. Therefore, the harness in the electric power supply system connecting the three electric components in the electric power supply system, which are the regulator 41, the relay box 42 and the fuse box 43 disposed in the electric component mounting space S, can be reduced in length.

The ECU 48 is disposed on the upper surface of the air cleaner 29 immediately behind the electric component mounting space S. Therefore, the harness in the control system for connecting the ECU 48 to the regulator 41, the relay box 42 and the fuse box 43 can also be reduced in length. Since the harness can be reduced, the weight and the cost can be reduced. Moreover, since the harness which is thick, has a great weight, and is not easily bent, can be reduced in length, it can be easily mounted to the motorcycle 1.

In addition, since the ECU 48 is accommodated in the recessed accommodating section 29b on the upper surface of the air cleaner 29, the air cleaner 29 made of a resin serves as an electromagnetic shield, which can lessen an influence of a noise on the ECU 48. The reduction of the length of the harness in the control system as described above also has advantages that generation of a noise can be prevented.

Although the electric component mounting space S of a great size is provided in front of the air cleaner 29 and the fuel tank 30, the entire fuel tank 30 is disposed at a relatively rearward position, and the rear end portion of the fuel tank 30 is positioned behind and below the rear end of the main frame 8. Thus, a required fuel tank volume can be ensured.

—Other Embodiment—

The above described embodiment is merely exemplary, and is not intended to limit the present invention, applications of the present invention, and uses of the present invention. Regarding the layout of the electric components in the electric power supply system and the harnesses in the straddle vehicle of the present invention, changes, addition, and deletion can be made for the configuration of the embodiment, without departing from the spirit of the present invention.

Although in the above described embodiment, for example, the regulator 41, the relay box 42 and the fuse box 43 which are the electric components in the electric power supply system are disposed in the electric component mounting space S, the present invention is not limited to this. Two or more of the electric components in the electric power supply system, including at least the relay box 42, may be disposed in the electric component mounting space S. Or, in addition to these components, for example, electric components such as a signal relay, an engine diagnosis device, the ECU, an ABS diagnosis device, the battery, etc., may be disposed in the electric component mounting space S.

Although in the above described embodiment, the regulator 41 is disposed at a relatively lower region in the electric component mounting space S, and the relay box 42 and the fuse box 43 are disposed above the regulator 41 in the electric component mounting space S, a mutual positional relationship among the regulator 41, the relay box 42 and the fuse box 43 is not limited to this.

Although in the motorcycle 1 of the above described embodiment, the main frame 8 and the rear frame 10 are joined to each other by means of the cross member 9 having the closed cross-section structure, this is merely a preferable frame structure. Another frame structure may be used so long as the rear end portion of the fuel tank 30 is positioned behind the rear end of the main frame 8 so that the volume of the fuel tank 30 can be ensured.

Moreover, the straddle vehicle of the present invention is not limited to the motorcycle 1, but may be, for example, an ATV (all terrain vehicle), a small truck, etc. A driving source of the straddle vehicle is not limited to the engine 20, but may be, for example, an electric motor.

INDUSTRIAL APPLICABILITY

In accordance with the present invention, a harness can be reduced, weight and cost can be reduced, and assembling work can be made easier in a straddle vehicle. Therefore, the present invention is advantageously applicable to a motorcycle which can attain such great advantages.

REFERENCE CHARACTERS LIST

1 motorcycle (straddle vehicle)
6 head pipe
8 main frame
9 cross member
29 air cleaner
29a air-intake duct
29b recessed accommodating section of ECU
30 fuel tank
41 regulator (electric component in electric power supply system)
41a case
41b heat radiation plate
41d coupler
42 relay box (electric component in electric power supply system)
43 fuse box (electric component in electric power supply system)
44 ignition switch
46 detachable cover
48 ECU (engine control unit)
S electric component mounting space

The invention claimed is:

1. A straddle vehicle in which an ignition switch is disposed in the vicinity of a head pipe of a vehicle body frame, comprising:
   a fuel tank disposed behind and distant from the head pipe;
   an air cleaner disposed behind and distant from the head pipe;
   an electric component mounting space which is provided between the head pipe, and the fuel tank and the air cleaner which are behind the head pipe, and in which electric components in an electric power supply system, including a relay box of ignition, a regulator, and a fuse box, are disposed;
   a heat radiation plate attached to a case of the regulator, the heat radiation plate being disposed below a lower end of the head pipe to directly receive ram air from forward; and
   a coupler of a harness connected to the case, the coupler being disposed behind a bracket fastened to the vehicle body frame not to directly receive the ram air.

2. The straddle vehicle according to claim 1, wherein the fuse box is disposed above the regulator and covered with a detachable cover, from above.

3. The straddle vehicle according to claim 1, wherein the air cleaner is disposed below the fuel tank, the straddle vehicle further comprising:
an ECU accommodated in a recess formed on an upper surface of the air cleaner.

4. The straddle vehicle according to claim 1, comprising:
a main frame extending rearward from the head pipe;
wherein a rear end of the fuel tank is positioned behind a rear end of the main frame.

5. The straddle vehicle according to claim 1, comprising:
an ECU that is disposed behind and distant from the electric component mounting space.

6. The straddle vehicle according to claim 1, wherein the ignition switch is disposed behind the head pipe.

7. The straddle vehicle according to claim 1, wherein
the vehicle body frame includes a pair of right and left frame members extending rearward from the head pipe,
wherein the electric component mounting space is provided between the pair of right and left frame members in the vicinity of the head pipe, in a location at which the space is surrounded by the right and left frame members, and
wherein the ignition switch is disposed in the electric component mounting space, and the relay box is located rearward relative to the ignition switch.

8. The straddle vehicle according to claim 1, comprising:
a seat which is located rearward relative to the head pipe and is configured to be straddled by a rider,
wherein the electric component mounting space is located above the seat.

9. A straddle vehicle in which an ignition switch is disposed in the vicinity of a head pipe of a vehicle body frame, comprising:
a fuel tank disposed behind and distant from the head pipe;
an electric component mounting space, which is provided between the head pipe and the fuel tank which is behind the head pipe and between frame members extending rearward from the head pipe and gradually outward in a vehicle width direction, and in which electric components in an electric power supply system, including at least a relay box of ignition, are disposed;
an air cleaner disposed behind and distant from the head pipe, the electric component mounting space being provided between the head pipe and the air cleaner; and
air-intake ducts provided at right and left sides of a front portion of the air cleaner such that the air-intake ducts extend forward at right and left sides of the electric component mounting space in front of the air cleaner, respectively.

* * * * *